United States Patent [19]

Dagdeviren et al.

[11] Patent Number: 5,787,088
[45] Date of Patent: Jul. 28, 1998

[54] METHOD AND SYSTEM FOR INTEROPERATING BETWEEN ISDN AND PSTN TRANSPORT FOR ALLOWING SIMULTANEOUS TRANSMISSION OF VOICE AND DATA OVER ONE TELEPHONE LINE

[75] Inventors: Nuri Ruhi Dagdeviren, Red Bank; Jerome Prestinario, Bridgewater, both of N.J.; Kenneth R. Klein, Riegelsville, Pa.; Mahendra Pratap, Cliffwood Beach, N.J.

[73] Assignee: AT&T Corp, Middletown, N.J.

[21] Appl. No.: 556,726

[22] Filed: Nov. 13, 1995

[51] Int. Cl.⁶ .................... H04J 3/04; H04M 11/06
[52] U.S. Cl. ............................ 370/493; 370/535
[58] Field of Search ............... 370/60, 60.1, 62, 370/79, 94.1, 94.2, 110.1, 112, 389, 355, 474, 477, 493, 494, 495, 535, 537, 542; 379/93

[56] References Cited

U.S. PATENT DOCUMENTS

| | | | |
|---|---|---|---|
| 3,701,851 | 10/1972 | Starrett | 179/15 |
| 4,442,540 | 4/1984 | Allen | 381/31 |
| 4,455,649 | 6/1984 | Esteban et al. | 370/80 |
| 4,476,559 | 10/1984 | Brolin et al. | 370/110.1 |
| 4,479,213 | 10/1984 | Galand et al. | 370/118 |
| 4,593,389 | 6/1986 | Wurzburg et al. | 370/110.1 |
| 4,635,253 | 1/1987 | Urui et al. | 370/67 |
| 4,670,874 | 6/1987 | Sato et al. | 370/110.1 |
| 4,903,261 | 2/1990 | Baran et al. | 370/94.2 |
| 5,187,591 | 2/1993 | Guy et al. | 358/425 |
| 5,214,650 | 5/1993 | Renner et al. | 370/110.1 |
| 5,341,374 | 8/1994 | Lewen et al. | 370/85.4 |
| 5,463,616 | 10/1995 | Kruse et al. | 370/24 |
| 5,506,866 | 4/1996 | Bremer et al. | 375/216 |
| 5,511,075 | 4/1996 | Bhasker | 370/85.13 |

Primary Examiner—Hassan Kizou
Attorney, Agent, or Firm—Morgan & Finnegan

[57] ABSTRACT

A telephone system simultaneously transmits voice and data through a public switched telephone network and over one telephone line between a calling party location having an ISDN connection and a destination party location having a POTS analog connection. The calling party location determines if the destination party location has an analog POTS connection and then creates a connection between the calling party and the destination party. Data and voice band signals are packetized and multiplexed and transmitted through the public switched telephone network to a modem located at the destination party location. The packets are demultiplexed into separate voice band and digital signal components and the digital signal components demodulated within the modem. The demodulated data signals are forwarded to a data terminal and a voice band signals forwarded to an analog terminal.

8 Claims, 3 Drawing Sheets

METHOD AND SYSTEM FOR INTEROPERATING BETWEEN ISDN AND PSTN TRANSPORT FOR ALLOWING SIMULTANEOUS TRANSMISSION OF VOICE AND DATA OVER ONE TELEPHONE LINE

FIELD OF THE INVENTION

This invention relates to a method and system for simultaneously transmitting voice and data through a public switched telephone network and over one telephone line between a calling party location having an ISDN connection and a destination party location having a POTS analog connection.

BACKGROUND OF THE INVENTION

Many businesses and individuals use telephone lines that meet standards of the Integrated Services Digital Network (ISDN) for connecting to the public switched telephone network. ISDN lines allow rapid data transfer, such as 64 k bytes per second.

Those businesses using ISDN can communicate with other businesses having similar ISDN connections with simultaneous voice and data connections. Between the two existing ISDN connections, it is possible to digitize voice, optionally compress voice and data, and even multiplex voice and data. The schemes for communicating between two ISDN connections include error correction schemes and frame information and control commands. Many other characteristics and configurations are possible to those skilled in the art when two business using ISDN connections communicate with each other.

Some businesses and individuals, however, have not adapted ISDN as rapidly as some proponents desired. Thus, these individuals and businesses are still connected to the public switched telephone network via a Plain Old Telephone Service (POTS) or analog connection, also called a Tip-Ring (T/R) connection. As a result, if another business with an ISDN connection and using standard protocol attempts simultaneous voice and data communication from the ISDN connection, through the network to the POTS line, the communication would fail.

There are presently existing schemes and protocols that allow simultaneous voice and data communication between two analog (POTS) lines using modems. However, there is now no existing scheme for simultaneous voice and data communication between an ISDN connection and a standard POTS connection.

SUMMARY OF THE INVENTION

The advantages and features of the present invention now allow simultaneous transmission through a public switched telephone network and over one telephone line between a calling party location having an ISDN connection and a destination party location having a POTS analog connection.

In accordance with the present invention, the calling party location includes an appropriate software platform for determining if the calling party location has an analog POTS connection. When the software platform determines that there is an analog POTS terminus at the destination, a connection is created between the calling party location and the destination party location. Data and voice band signals are packetized and then multiplexed at the calling party location. The multiplexed data and voice band packets are transmitted through the public switched telephone network to a specialized modem located at the destination party location. The packets are demultiplexed into separate voice band and digital signal components and demodulated within the modem. The demodulated data signals are forwarded to a data terminal and the voice band signals are forwarded to an analog terminal such as a standard telephone.

The present invention now allows an ISDN subscriber to communicate with a destination party connected by a POTS, and allow at the destination simultaneous use of a computer while also using the standard POTS telephone. Data signals can be modulated within the modem at the destination party location. The data in any voice band signals can be packetized and multiplexed and then transmitted through the public switched telephone network to the calling party location. At the calling party location, the packets are demultiplexed.

In one aspect of the invention, the voice can be digitized at the ISDN calling party location and the digitized voice and data compressed.

BRIEF DESCRIPTION OF THE DRAWINGS

The foregoing and other objects and advantages of the present invention will be appreciated more fully from the following description, with references to the accompanying drawings in which.

DETAILED DESCRIPTION

Figure 1:
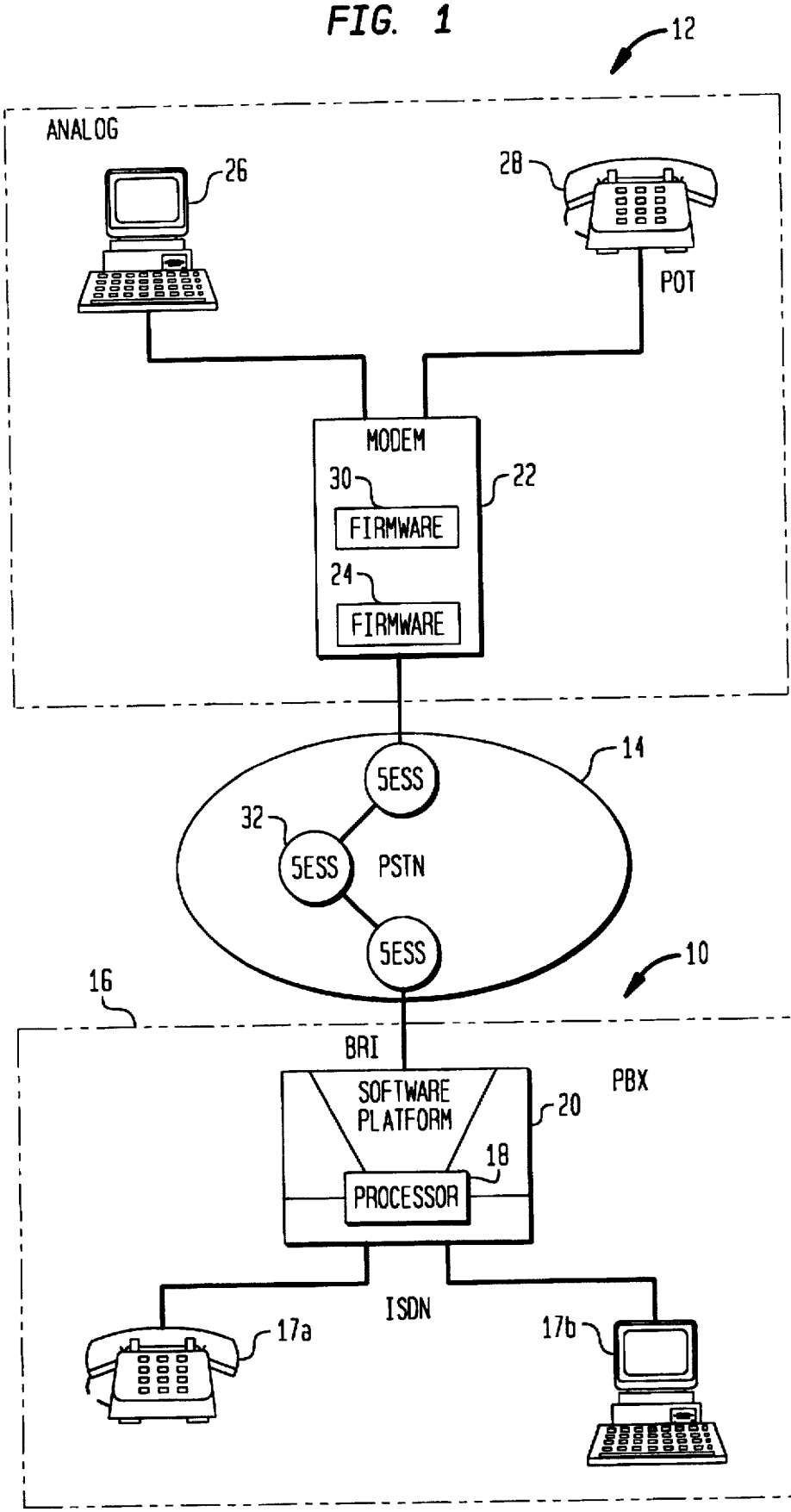
FIG. 1 is an overview showing one aspect of the system of the present invention having a calling party having an ISDN connection and a destination party having a POTS connection.

Referring now to FIG. 1, there is illustrated a general overview of the system of the present invention that allows simultaneous voice and data transmission through a public switched telephone network and over one telephone line between a calling party location, indicated generally at 10 and having an ISDN connection and a destination party location, indicated generally at 12, and having a POTS analog connection to the public switched telephone network 14. This analog connection is also termed a Tip-Ring, (T/R) connection. In the illustrated embodiment, the destination party location 12 is a residential premises. In FIG. 1, the calling party location 10 is illustrated as a Private Branch Exchange (PBX) 16 and includes a Basic Rate Interface (BRI) that can use a single B channel at 64 kbps. As illustrated, an ISDN telephone 17a and standard computer 17b are connected into a processor 18 of the Private Branch Exchange 16. The processor 18 includes a software program with advanced protocol as explained below. The software program together with the processor 18 are termed hereafter as the Software Platform 20. The Software Platform 20 emulates a simultaneous voice and data protocol and signalling for a specialized modem 22 located at the destination party location 12. The Software Platform 20 also includes the software working with the processor 18 for determining if a calling party location 10 has an analog POTS connection.

In accordance with the present invention, after the Software Platform 20 determines that the destination party location 12 has an analog POTS connection, a connection is created between the calling party location 10 and the destination party location 12. The data and voice band signals are packetized and multiplexed at the calling party location 10 with the Software Platform and then transmitted as packets through the public switched telephone network 14 to the modem 22 located at the destination party location 12.

This modem 22 has appropriate specialized firmware 24 that will work with a special protocol for demultiplexing the packets into separate voice band and digital signals components and then demodulating the digital signal components within the modem 22. The demodulated data signals are forwarded to a data terminal such as a computer 26, and voice band signals are forwarded to an analog terminal, such as the standard POTS telephone 28.

As illustrated, the destination party location 12 includes a computer 26 and POTS telephone 28 connected directly to the modem 22. In accordance with the present invention, the modem includes firmware 30 that modulates the digital signal from the computer and packetizes and multiplexes the data and voice band signals received from the computer 26 and destination party location 12. The packets are then transmitted through the public switched telephone network 14 to the calling party location 10.

As is well known to those skilled in the art, the network switches 32, typically 5ESS switches, convert signals from digital to analog as the signal reaches the destination party location 12 and its modem 22. In accordance with the present invention, the modem 22 takes the signal received from the network 14, and breaks it up into voice and data components for signaling to the telephone and computer as needed.

Figure 2:
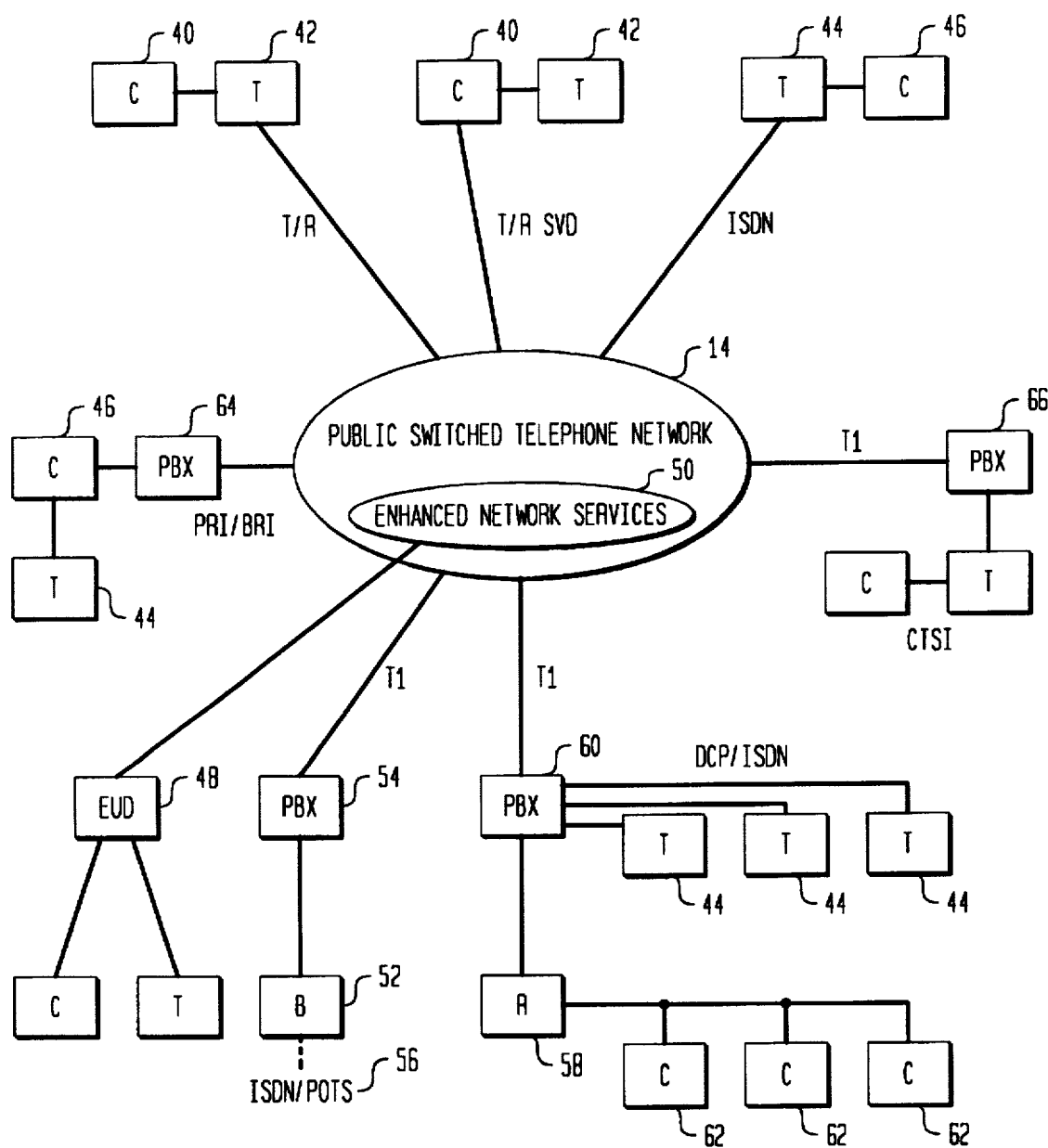
FIG. 2 illustrates the different types of Tip-Ring (POTS) and ISDN scenarios that can be used with the method and system of the present invention.

Referring now to FIG. 2, there is illustrated a public switched telephone network and various scenarios of different ISDN and analog (T/R) systems that can be used with the present invention. In the illustrated embodiment, conventional computers 40 and telephones 42 can be connected to an analog, or T/R line. Additionally, ISDN telephones 44 and standard computers 46 can be connected into lines having an ISDN connection. End user devices 48 can be connected to enhanced network services 50 of the network 14 and a bridge 52 can be connected to a Private Branch Exchange 54 and an ISDN/POTS 56. Also, a router 58 could be connected to a Private Branch Exchange 60 and then connected to a plurality of computers 62. ISDN telephones 44 would be included within the PBX 60. Another computer 46 and telephone 44 connect within a PBX 64, which connects to the Network via a PRI/BRI as known to those skilled in the art. Another computer 46 and telephone 44 can connect to a PBX 66, which includes a Computer Telephone Sync. Interface (CTSI).

The Software Platform 20 provides advanced digital signal processing (DSP) algorithms. The analog connection at the destination party location 12 does not include appropriate software to rectify the problem of information transfer between the digital ISDN line and the analog line. The digital signal processing algorithms to, part of the Software Platform 20, can sort the various signals because that software at the calling party location 10 determines in advance the capabilities of the other end point, i.e., the analog connection at the destination party location.

The Software Platform 20 at the calling party location 10 also reconstructs speech from the analog connection and it can extract digitized text provided it knows when text is present. This is determined by the Software Platform 20. It can recover simultaneous voice and data by interpreting a converted wave form. The normal line interface is used and backed up by a smart DSP as known to those skilled in the art. The DSP algorithm works one way when the destination party location 12 has digital ISDN connection and works another way when it has an analog connection as in the present invention. The DSP is programmable on the Software Platform 20. This technique used for point-to-point calls can be used for multiple point conferences as well. As long as the exchange handling the conference is aware of end point capabilities such as ISDN or POTS connection, it can instruct its own DSP to correctly deal with the situation.

In accordance with the present invention, the voice and data can be compressed and digitized. The system can include multiplexing of voice and data with an error correction scheme, as well as frame information and control commands. Other services can be included which become apparent to those skilled in the art.

Figure 3:
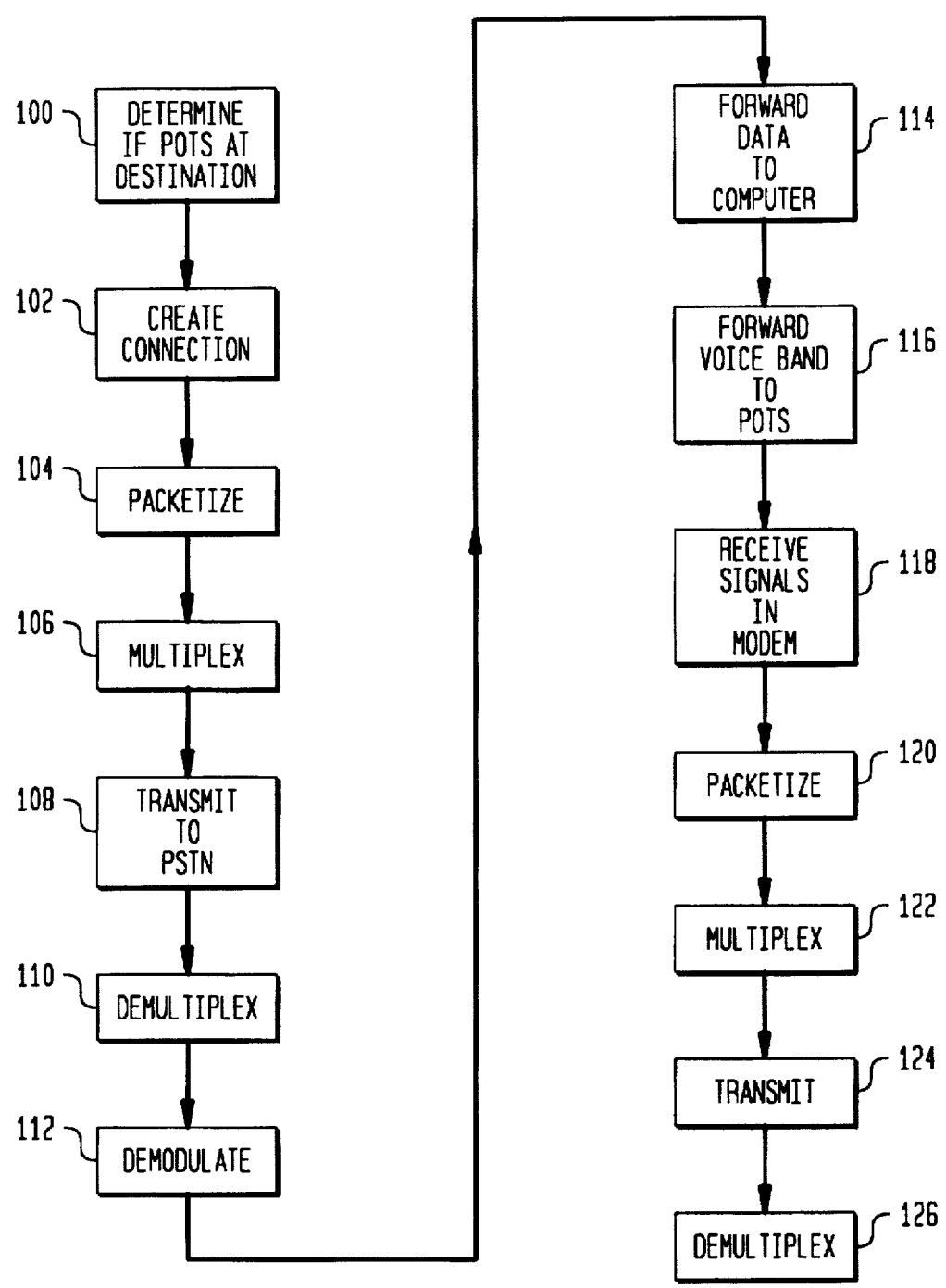
FIG. 3 is a high level flow chart depicting one aspect of the method and system of the present invention.

Referring now to FIG. 3, there is illustrated a high level flow chart which depicts the method of the present invention. For purposes of understanding, all blocks are numbered with the sequence starting at 100.

When a call is made from a calling party location 10 to a destination party location 12, the Software Platform 20 first determines whether the destination party location 12 has an analog POTS connection. (Block 100). When so determined, a connection is created between the calling party location 12 and the destination party location 12 (block 102). Data and voice band signals are packetized (block 104) and multiplexed (block 106) at the calling party location by the Software Platform 20. The multiplexed data and voice band packets are then transmitted through the Public Switched Telephone Network to the modem 22 located at the destination party location (block 108). The packets are demultiplexed into separate voice band and digital signal components (block 110) and digital signal components demodulated within the modem (block 112). The demodulated data signals are then forwarded to a data terminal, such as the computer, (block 114) and the voice band signals are forwarded to an analog terminal such as the POTS telephone (block 116).

Any signals generated by the computer and telephone at the destination party location are received in the modem (block 118). The data and voice band signals are packetized (block 120) and multiplexed (block 122). The multiplexed packets are then transmitted through the public switched telephone network to the calling party location (block 124). The packets are demultiplexed at the calling party location (block 126).

It should be understood that the foregoing description of the invention is intended merely to be illustrative thereof, and that other embodiments, modifications and equivalents may be apparent to those skilled in the art without departing from its spirit.

That which is claimed is:

1. A method for simultaneously transmitting voice and data through a public switched telephone network and over one telephone line between a calling party location having an ISDN connection and a destination party location having a POTS analog connection comprising determining if the destination party location has an analog POTS connection, creating a connection between the calling party location and the destination party location, packetizing the data and voice band signals and multiplexing them at the calling party location, transmitting the multiplexed data and voice band packets through the public switched telephone network to a modem located at the destination party location, demultiplexing the packets into separate voice band and digital signal components and demodulating the digital signal components within the modem, and forwarding demodulated data signals to a data terminal and voice band signals to an analog terminal.

2. The method according to claim 1 including modulating data signals within the modem, packetizing and multiplexing the data and any voice band signals received from the destination party location, transmitting the multiplexed packets through the public switched telephone network to the calling party location, and demultiplexing the packets at the calling party location.

3. The method according to claim 1 including digitizing the voice at the ISDN calling party location.

4. The method according to claim 3 including compressing the digitized voice and data.

5. A system for simultaneously transmitting voice and data through a public switched telephone network and over one telephone line between a calling party location having an ISDN connection to a destination party location having a POTS analog connection comprising processing means positioned at the calling party location for determining if the destination party location has an analog POTS connection, means for generating a phone connection between the calling party location and the destination party location having the POTS analog connection, means for packetizing the data and voice band signals and multiplexing the packets at the calling party location, means for transmitting the multiplexed data and voice band packets through the public switched telephone network to the destination party location, and a modem at the destination party location for receiving the packets transmitted from the calling party location, said modem including processing means for a) demultiplexing the packets into separate voice band and digital signal components, b) demodulating the digital signal components within the modem, and c) forwarding demodulated data signals to a data terminal and voice band signals to an analog terminal.

6. The system according to claim 5 wherein said modem includes means for modulating data signals within the modem, means for packetizing and multiplexing the data and any voice band signals received from the destination party location, means for transmitting the multiplexed packets through the public switched telephone network to the calling party location, and means for demultiplexing the packets at the calling party location.

7. The system according to claim 5 including means for digitizing the voice at the ISDN calling party location.

8. The system according to claim 7 including means for compressing the digitized voice and data.

* * * * *